United States Patent [19]

Yoshida et al.

[11] 4,143,903
[45] Mar. 13, 1979

[54] MOUNTING APPARATUS OF DRIVER'S CAB FOR EARTH MOVING VEHICLE

[75] Inventors: Shuji Yoshida, Sakai; Hiroyoshi Kaihori, Hirakata, both of Japan

[73] Assignee: Kabushiki Kaisha Komatsu Seisakusho, Tokyo, Japan

[21] Appl. No.: 818,149

[22] Filed: Jul. 22, 1977

[30] Foreign Application Priority Data

Jul. 22, 1976 [JP] Japan .............................. 51-96796[U]

[51] Int. Cl.² .......................................... B62D 27/04
[52] U.S. Cl. .................................. 296/35 R; 296/190
[58] Field of Search .......................... 296/28 C, 35 R; 267/57.1 R, 63 R, 63 A; 188/321

[56] References Cited

U.S. PATENT DOCUMENTS

| 3,949,975 | 4/1976 | Miers ..................................... 267/136 |
| 3,985,385 | 10/1976 | Kennicutt ........................... 296/35 R |
| 4,007,924 | 2/1977 | Jorn et al. ....................... 267/57.1 R |

Primary Examiner—Joseph F. Peters, Jr.
Assistant Examiner—Gene A. Church
Attorney, Agent, or Firm—Armstrong, Nikaido, Marmelstein & Kubovcik

[57] ABSTRACT

A mounting apparatus of driver's cab for earth moving vehicle wherein the driver's cab is mounted on a body frame of the vehicle through rubber cushion members so as to insulate the driver's cab from vibrations.

The apparatus comprising a body frame of the vehicle, a box-like bracket fixedly secured to said body frame, a pair of rubber cushion members disposed in said box-like bracket, said rubber cushion members having concavities defining a room therebetween, a block disposed within said room, a frame of the driver's cab, and a bolt for connecting said frame of the driver's cab to said box-like bracket.

3 Claims, 3 Drawing Figures

MOUNTING APPARATUS OF DRIVER'S CAB FOR EARTH MOVING VEHICLE

BACKGROUND OF THE INVENTION

This invention relates to a mounting apparatus of driver's cab for earth moving vehicles such as bulldozers or the like.

Earth moving machines such as bulldozers etc. have in many cases a driver's cab mounted thereon. The conventional mounting apparatus of driver's cab of the kind specified has employed rollover protective structures; however, the driver's cab of such kind is of a sound-proof construction and is formed as an integral part of its bed plate. Therefore, the driver's cab itself is considerably heavy, and so the mounting apparatus of the conventional rollover protective structures has insufficient shock absorbing capacity thereby generating vibration in the driver's cab. Consequently, the conventinal mounting apparatus could not meet its requirements satisfactorily, and its life time was short.

SUMMARY OF THE INVENTION

It is therefore an object of the present invention to provide a mounting apparatus of driver's cab for earth moving vehicle wherein the driver's cab is mounted on a body frame of the vehicle through rubber cushion members so as to insulate the driver's cab from vibrations.

Another object of the present invention is to provide a durable mounting of the driver's cab to the body frame of the earth moving vehicle.

According to an aspect of the present invention, there is provided a mounting apparatus of driver's cab for earth moving vehicle comprising a body frame of the vehicle, a box-like bracket fixedly secured to said body frame, said box-like bracket having holes formed therein at one of pairs of opposing side walls thereof, a pair of rubber cushion members disposed in said box-like bracket, said rubber cushion members having concavities defining a room therebetween, a block disposed within said room, said block having a threaded hole formed therein, a frame of the driver's cab, bolt means for connecting said frame of the driver's cab to said box-like bracket, and collar means mounted on said bolt means within the threaded hole of said block, said collar means having threaded outer periphery so as to engage with the threaded hole of said block.

Other objects, features and advantages of the present invention will be readily apparent from the following description taken in conjunction with the accompanying drawings.

DETAILED DESCRIPTION OF THE INVENTION

Figure 1:
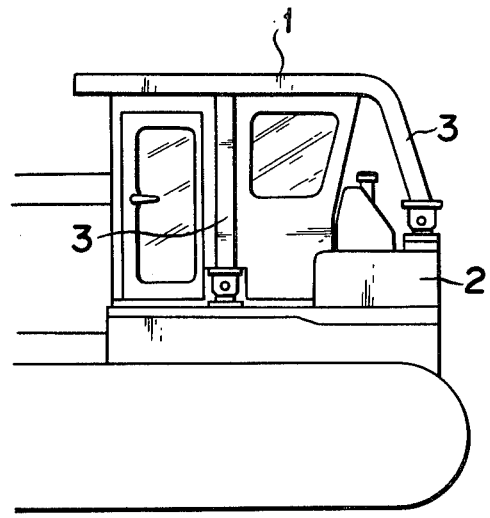
FIG. 1 is a partial side view of an earth moving vehicle employing a mounting apparatus of the driver's cab according to the present invention.
Figure 2:
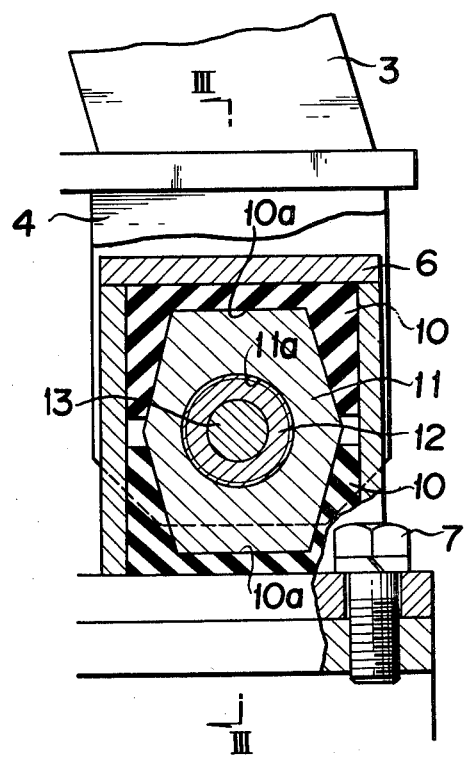
FIG. 2 is an enlarged front elevational view partially in cross-section of the present invention.
Figure 3:
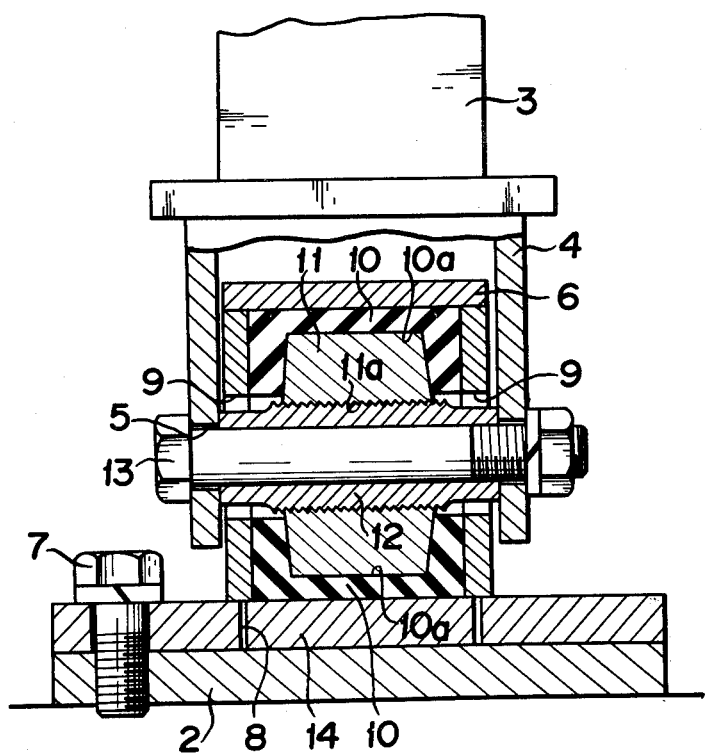
FIG. 3 is a cross-sectional view taken along the line III—III in FIG. 2.

In the drawings, reference numeral 1 denotes a driver's cab having a roll-over protective structure as a main body, and 2 a vehicle body. The driver's cab 1 has left and right and front and rear legs 3, and the lower end of each leg forms a yoke 4 having a hole 5 formed on the side thereof through which a pin passes. A bracket 6 is fixedly secured by means of bolts 7 in a position opposite to the leg 3 of the vehicle body 2. The bracket 6 is formed in a shape of a box having a lower part opening through holes 8, and has side holes 9 of a diameter larger than that of the holes 5 and formed in the opposite walls in positions opposite to the holes 5. Reference numerals 10, 10 denote a pair of cushion rubber members disposed tightly and oppositely in the vertical direction within the bracket 6. The cushion rubber members 10, 10 have frusta-conical quadrangular pyramid shaped recesses 10a, 10a formed on the opposite sides thereof, respectively. Reference numeral 11 denotes a block adapted to be fitted in the space defined between the opposed cushion rubber member 10 and 10. The block 11 is slightly bigger than the above-mentioned space so that it may deflect the cushion rubber member 10, 10 to some extent when it is fitted in the space. The block 11 has a screw threaded hole 11a having a diameter smaller than side holes 9 and formed in a position opposite thereto. A collar 12 adapted to pass through the side holes 9 of the bracket 6 is threadably engaged with the screw threaded hole 11a. The collar 12 is formed to have a length equal to the inside dimension of the yoke 4. Reference numeral 13 denotes a bolt extending through the leg 3 and the collar 12 for connecting the yoke 4 of the leg 3 and the collar 12.

Thus, when mounting the driver's cab 1 on the vehicle body 2, one of the cushion rubber members 10, 10 is placed in the bracket 6, and then the block 11 is inserted in the cushion rubber member 10. After that, the collar 12 is inserted through the side holes 9 into the block 11. In the next place, another cushion rubber member 10 is placed on the block 11, and the whole assembly is covered by a plate 14. Thereafter, the bracket 6 is fixedly secured to the vehicle body 2 by means of bolts 7. Thereafter, the bracket 6 is inserted in the yoke 4 of the leg 3, and then the bolt 13 is passed through the holes 5 of the yoke 4 and the collar 12 assembed with the bracket 6 and is tightened up by screwing nuts on it thereby connecting the leg 3 and the bracket 6.

In the above-mentioned construction, the yoke 4 of the leg 3 is connected to the bracket 6 through intermediary of the cushion rubber member 10, 10, pressed with a slight deflection into the space defined between the block 11 fixedly secured to the side of the yoke 4 and the bracket 6, and therefore the vibration produced between the yoke 4 and the bracket 6 can be absorbed by the cushion rubber members 10, 10.

The above-mentioned example of the present invention shows a type wherein the yoke 4 is fixedly secured to the driver's cab 1 and the bracket 6 is fixedly secured to the side of the vehicle body 2; however such construction can be made vice versa. Further, the shape of the space defined between the cushion rubber members 10, 10 and that of the block 11 fitted in the space are not to be limited to the frusta-conical quadrangular pyramid shape, and instead they may be formed in frusta-conical pentagonal or hexagonal pyramid shape.

It is to be understood that the foregoing description is merely illustrative of the preferred embodiment of the invention and that the scope of the invention is not to be limited thereto, but is to be determined by the scope of the appended claims.

What is claimed is:

1. A mounting apparatus for a driver's cab for an earth moving vehicle comprising a body frame of the vehicle; a box-like bracket fixedly secured to said body frame, said box-like bracket having holes formed therein at one of the pairs of opposing side walls thereof;

a pair of rubber cushion members disposed in said box-like bracket, said rubber cushion members having concavities defining a space therebetween;
a block disposed within the space defined by said rubber cushion members, said block having a threaded hole formed therein;
a frame for the driver's cab;
bold mounted for connecting said frame of the driver's cab to said box-like bracket; and
collar means mounted on said bolt means within the threaded hole of said block, said collar means having a threaded outer periphery so as to engage with the threaded hole of said block.

2. The mounting apparatus as defined in claim wherein a yoke is formed at the tip of said frame of the driver's cab, said yoke having holes formed therein so as to permit said bolt means inserted therethrough.

3. The mounting apparatus as defined in claim 1 wherein the size of said block is slightly larger than that of the space defined between said cushion rubber members so as to compress said cushion rubber members within said box-like bracket.

* * * * *